UNITED STATES PATENT OFFICE.

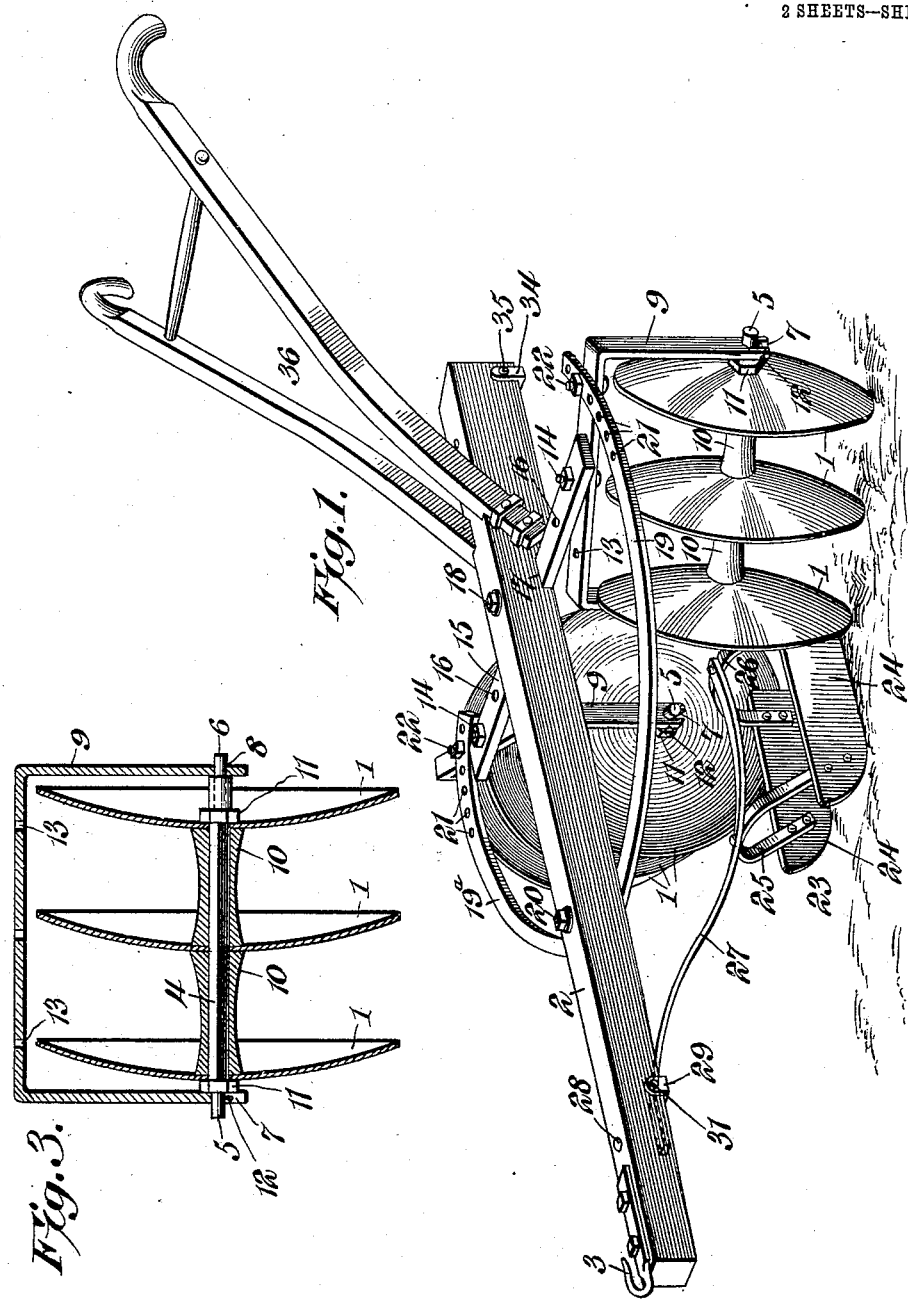

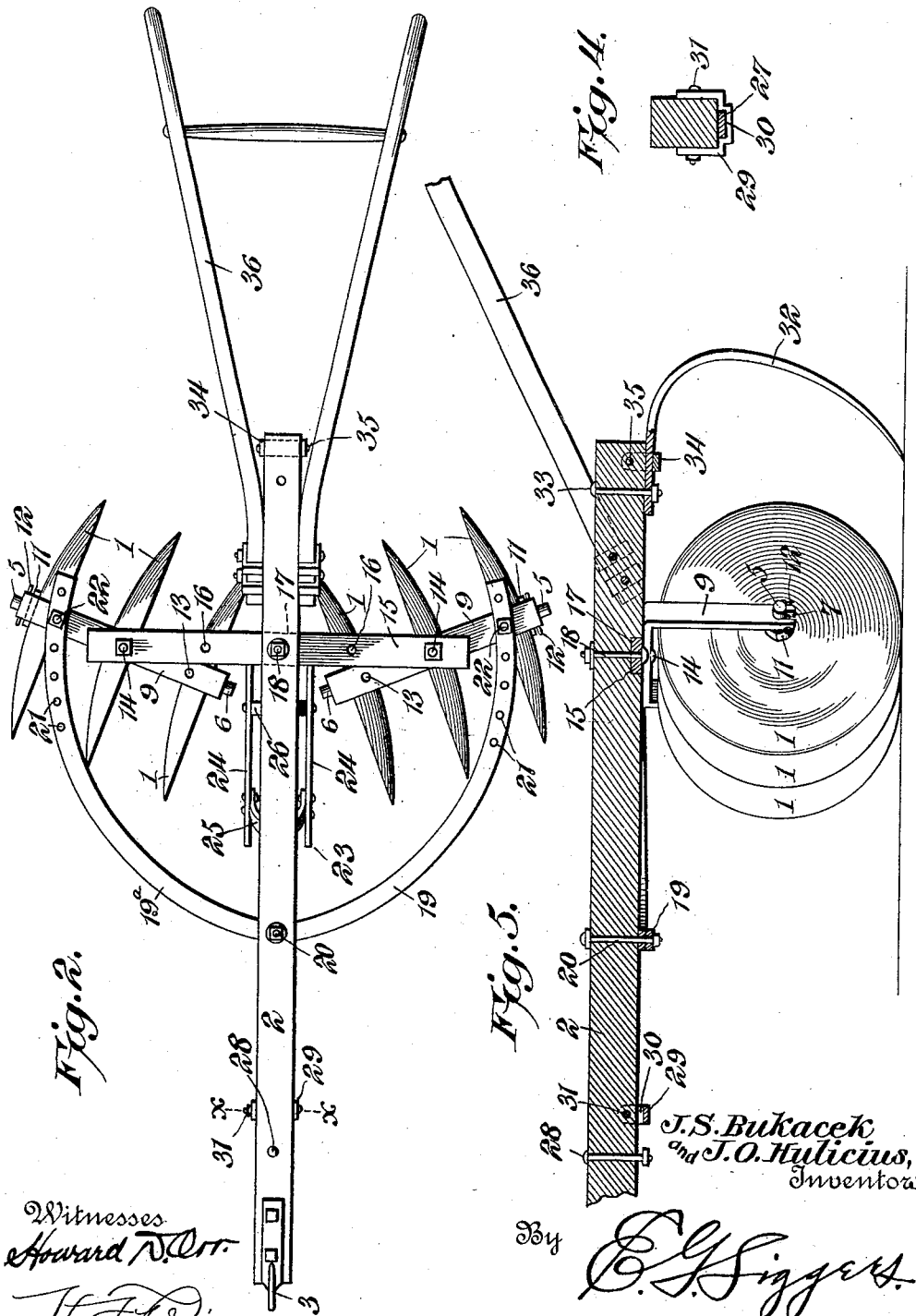

JOSEPH S. BUKACEK AND JOSEPH O. HULICIUS, OF RIVERSIDE, ALABAMA.

DISK CULTIVATOR.

No. 914,921.      Specification of Letters Patent.      Patented March 9, 1909.

Application filed June 20, 1907. Serial No. 379,980.

*To all whom it may concern:*

Be it known that we, JOSEPH S. BUKACEK and JOSEPH O. HULICIUS, citizens of the United States, residing at Riverside, in the county of St. Clair and State of Alabama, have invented a new and useful Disk Cultivator, of which the following is a specification.

The invention relates to improvements in disk cultivators.

The object of the present invention is to improve the construction of disk cultivators, and to provide a simple, inexpensive and efficient disk cultivator, adapted to be drawn by a single horse, and designed particularly for cultivating small or stumpy fields, where a two horse disk cultivator is practically useless.

A further object of the invention is to provide a disk cultivator of this character, adapted to be advantageously employed on extensive farms, and capable of operating between the rows of plants, when the latter are too tall to admit of the soil being cultivated by a two horse straddle row cultivator.

Another object of the invention is to provide a disk cultivator of this character having spaced gangs of disks capable of lateral and pivotal adjustment, to space the gangs the desired distance apart, and to arrange the disks for throwing the soil either toward or from the center of the cultivator.

The invention also has for its object to provide means for preventing young plants from being covered up by the soil, when the disks are set to throw the soil toward the plants.

With these and other objects in view, the invention consists in the construction and novel combination of parts hereinafter fully described, illustrated in the accompanying drawings, and pointed out in the claim hereto appended; it being understood that various changes in the form, proportion, size and minor details of construction, within the scope of the claim, may be resorted to without departing from the spirit or sacrificing any of the advantages of the invention.

In the drawings:—Figure 1 is a perspective view of a single horse disk cultivator, constructed in accordance with this invention, the disks being arranged to throw the soil inwardly, and the fender being in position for preventing the plants from being covered. Fig. 2 is a plan view of the same. Fig. 3 is a transverse sectional view of one of the gangs of disks. Fig. 4 is a sectional view on the line x—x of Fig. 2, illustrating the manner of attaching the fender to the beam. Fig. 5 is a longitudinal sectional view, the fender being removed and a tooth being attached to the rear end of the beam for cutting down the hill between the inner disks of the gangs.

Like numerals of reference designate corresponding parts in all the figures of the drawings.

The single horse cultivator, while being particularly adapted for cultivating stumpy ground and for use in fields having short rows, may be advantageously employed on extensive farms, and it embodies two gangs of cultivating disks 1, spaced apart and located at opposite sides of a beam 2, which is provided at its front end with a suitable clevis 3 for the attachment of the draft animal. The disks are of the usual concavo-convex form and those of each gang are mounted on a shaft or axle 4, which is journaled at its ends 5 and 6 in suitable bearings 7 and 8 of an arch 9. The shaft is square in cross section and the disks are spaced apart by means of sleeves 10, provided with rectangular bores or openings to conform to the configuration of the shaft or axle 4, and the latter is threaded at the terminals of the squared portion to receive nuts 11. The inner bearing 8 consists of a circular bearing opening, through which the journal 6 extends, and the outer bearing 7 consists of a recess, extending upwardly from the lower end of the outer side of the arch, the journal 5 being retained in the recess by a key 12, or other suitable fastening device, but the axle or shaft may be detachably mounted on the sides of the arch, as will be readily understood.

The arches have horizontal top connecting portions, which are provided with suitable perforations 13 for the reception of bolts 14, or other suitable fastening devices for pivotally connecting the arches to a transverse bar 15, having similar perforations 16 and centrally secured to the lower face of the beams 2. The beam is preferably provided in its lower face with a transverse recess 17 for the reception of the bar 15, which is fastened to the beam by a bolt 18, or other suitable fastening device. The bar 15 forms a pair of laterally projecting arms, to which the said arches are adjustably pivoted. The arches are adapted to be turned on the pivots 14 to arrange them at the desired angle, and the detachable shaft or axle enables the disks to be arranged with their concave faces either toward or from the beam for throwing the soil either inwardly or outwardly.

The arches are secured in their pivotal adjustment by means of curved braces 19 and 19ª, consisting of a substantially semicircular bar or member, permanently pivoted by a bolt 20, or other suitable fastening device to the lower face of the beam at a point in advance of the gangs of disks, and extending rearwardly at each side of the beam. The rear portions of the braces 19 and 19ª are provided at intervals with perforations 21 for the reception of bolts 22, which pierce the arches and secure the latter in their pivotal adjustment. Any other suitable means, however, may be employed for adjustably connecting the arches to the arcuate brace 19 and 19ª.

When the outer portions of the arches are swung backwardly to points in rear of the transverse bar or member 15, and the disks are arranged to throw the soil toward the center of the cultivator, a fender 23 is arranged between the two gangs of disks to prevent young plants from being covered up by the soil. The fender is composed of a pair of longitudinal sides or blades 24, arranged in vertical planes and connected by front and rear arches 25 and 26. The arches are secured to the rear portion of an inclined resilient standard or member 27, which extends upwardly and forwardly from the front arch 25 to the face of the front portion of the beam 2. The upper front end of the resilient standard or member 27 is secured to the beam 2 by a bolt 28, or other suitable fastening device, and it is held against lateral oscillation by a substantially U-shaped stirrup or clip 29, composed of spaced sides and a transverse connecting portion, which is provided with a groove 30 to receive the standard or member 27. The sides of the stirrup or clip 29 are secured to the beam by a transverse fastening device 31. The fender is detachably connected with the beam, and when it is desired to use the fender, the standard 27 is passed through the clip or stirrup 29, and is secured by the bolt 28. The sides or blades of the fender are in the form of runners, their lower front corners being cut away and rounded, as shown, and the resilient standard 27 permits the fender to spring upward and downward in passing over obstructions, the disks being adapted to roll over the same without jarring the cultivator or the driver.

When the fender is not employed and the cultivator is used as a harrow, a spring tooth 32 is attached to the rear end of the beam to cut down the hill between the inner disks of the gangs. The spring tooth, which may be of any preferred construction, is secured to the beam by a single bolt 33, a stirrup or clip 34 being secured to the beam in rear of the bolt and preventing the spring tooth from swinging laterally on the bolt 33. The stirrup or clip, which is approximately U-shaped, is secured to the beam by a transverse bolt 35, as clearly illustrated in Fig. 5 of the drawings. The beam is equipped with plow handles 36 of the ordinary construction, secured at their lower end to the opposite faces of the rear portion of the beam and connected near their upper end by a transverse rung.

This cultivator besides being lighter and less expensive than a two horse cultivator, also possesses the advantage of being able to cultivate the soil between rows of plants, when the latter are too high to admit of the use of a straddle row cultivator.

Having thus fully described our invention, what we claim as new and desire to secure by Leters Patent, is:—

In a cultivator, the combination of a longitudinal beam having fixed laterally extending arms provided at intervals with perforations, spaced gangs of cultivating devices provided with arches pivoted to the laterally extending arms and projecting beyond the outer ends of the arms, the pivots of the arches being adapted to be arranged in the said perforations to enable the arches to be adjusted along the arms in a direction transversely of the beam, and forwardly extending converging braces permanently pivoted to the beam in advance of the laterally extending arms and adjustably connected at points beyond the outer ends of the latter to the said arches and securing the same in their pivotal adjustment, said braces being independently adjustable and movable inwardly and outwardly with the arches in their adjustment transversely of the beam.

In testimony, that we claim the foregoing as our own, we have hereto affixed our signatures in the presence of two witnesses.

JOSEPH S. BUKACEK.
JOSEPH O. HULICIUS.

Witnesses:
J. L. TAYLOR,
T. J. ROUNTREE.